(12) United States Patent
Kunze

(10) Patent No.: US 6,791,936 B2
(45) Date of Patent: Sep. 14, 2004

(54) APPARATUS FOR PLAYING STORAGE DISCS

(75) Inventor: Norbert Kunze, Diez (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 276 days.

(21) Appl. No.: 09/944,301

(22) Filed: Aug. 31, 2001

(65) Prior Publication Data

US 2002/0067686 A1 Jun. 6, 2002

(30) Foreign Application Priority Data

Sep. 2, 2000 (DE) .......................................... 100 43 298

(51) Int. Cl.[7] .............................................. G11B 23/00
(52) U.S. Cl. ...................... 369/270; 369/75.1; 369/75.2
(58) Field of Search ...................... 360/99.07; 369/75.1, 369/75.2, 270

(56) References Cited

U.S. PATENT DOCUMENTS

| 2,518,232 | A | * | 8/1950 | Giovannucci et al. | ...... 369/271 |
| 5,195,078 | A | * | 3/1993 | Ikedo et al. | .............. 369/75.2 |
| 5,572,383 | A | * | 11/1996 | Hoshi et al. | ............. 360/99.05 |
| 2001/0004342 | A1 | * | 6/2001 | Noda et al. | ............... 369/44.32 |
| 2003/0026193 | A1 | * | 2/2003 | Shiomi et al. | .............. 369/270 |

FOREIGN PATENT DOCUMENTS

| EP | 0514607 A1 | 11/1992 | ........... G11B/33/08 |
| JP | 60160059 A | 8/1985 | ......... G11B/17/028 |
| JP | 09259496 A | 10/1997 | ......... G11B/17/028 |

* cited by examiner

Primary Examiner—A. J. Heinz
Assistant Examiner—Mark Blouin
(74) Attorney, Agent, or Firm—Michael E. Belk

(57) ABSTRACT

The invention relates to an apparatus for playing storage discs which can be set into rotation about a central axis of rotation (13) by a drive motor (15) and which cooperate with an optical unit (4) which during the rotation writes information onto or reads it from an active side, which storage disc (8) can be pressed against a disc platen (14) with the aid of a pressure device (5), which acts upon one of its disc surfaces (8c) in order to be held in its play position and to preclude vibrations of the storage disc (8) itself, the disc platen (14) having a diameter which substantially corresponds to that of the storage disc (8). The pressure device (5) of the apparatus acts only upon the information-free central (9) and is freely rotatable. The disc platen (14) is in frictional engagement with the storage disc (8) when this storage disc is pressed into position with the label side (8a) and is constructed as a turntable, which can be set into rotation by the drive motor (15).

22 Claims, 1 Drawing Sheet

APPARATUS FOR PLAYING STORAGE DISCS

The invention relates to an apparatus for playing storage discs which can be set into rotation about a central axis of rotation by a drive motor and which cooperate with an optical unit which during the rotation writes information onto or reads it from an active side, which storage disc can be pressed against a disc platen with the aid of a pressure device, which acts upon one of its disc surfaces in order to be held in its play position and to preclude vibrations of the storage disc itself, the disc platen having a diameter which substantially corresponds to that of the storage disc.

JP-A-09259496 describes an apparatus for playing optical storage discs. The apparatus has a turntable and a clamping disc. The turntable and the clamping disc have diameters corresponding to that of the optical storage disc. The turntable, which is situated underneath the storage disc, is rotationally driven for playing; the turntable receives the optical storage disc and can move this disc upwards against the freely rotatable clamping disc. The side of the storage disc to be provided with or provided with information faces downwards. As a consequence, the optical unit of the apparatus is situated underneath said disc and reads it or inscribes it from underneath. In order to achieve that the laser light, which should pass through the turntable, reaches the storage disc, this turntable consists of a transparent material. Disc vibrations are suppressed between the large-area turntable and clamping disc but the construction is susceptible to soiling.

From JP-A-60 160 059 an apparatus construction is known by means of which natural vibrations of an optical storage disc are to be precluded. For this purpose, a damping disc is placed onto the storage disc during operation. The mechanism used for placement and the required space are not acceptable in the case of compact apparatuses.

It is an object of the invention to provide an apparatus of the type defined in the opening paragraph, which is of simple construction, which is compact and in which vibrations of the storage disc with respect to the optical unit are precluded, particularly when used in a vehicle.

According to the invention said object is achieved by means of an apparatus having the following characteristic features:
a) the pressure device acts only upon the information-free central area of the storage disc,
b) the pressure device, which acts upon the information-free central area of the storage disc is freely rotatable,
c) the disc platen is in frictional engagement with the storage disc when this storage disc is pressed into position and is constructed as a turntable, which can be set into rotation by the drive motor,
d) the disc platen can be brought into contact with the label side of the storage disc.

In such an apparatus the functions have been reversed in comparison with the known apparatuses. The known disc platen, against which the storage disc is pressed in an upward direction, is no longer freely rotatable but converted into the driven turntable. The previously driven turntable of the apparatus is converted into a freely rotatable pressure member and merely serves to press the central part of the storage disc against the disc platen. This function reversal has substantial advantages. The construction requires little space, i.e. it can remain compact; the storage disc cannot vibrate freely and the laser light can reach the storage disc unimpededly, as a result of which the aforementioned soiling cannot occur. These conditions make it particularly suitable for mounting in motor vehicles. The disc platen is applied to the label side of the storage disc with friction. As a consequence, the storage disc is driven from the label side. Since the storage disc is in frictional engagement in the proximity of its periphery no intricate clamping mechanisms are required.

In a further embodiment of the invention the drive motor sets the disc platen into rotation via a belt. In another variant of the drive the disc platen itself is constructed as a drive motor. This results in the most suitable drive both spatially and economically.

In a further embodiment of the invention the pressure device comprises a spring-loaded pressure disc whose diameter does not exceed the diameter of the information-free area of the storage disc. This dimensioning provides adequate pressure and leaves room for the operation of the optical unit.

In a further embodiment of the invention the storage disc, in its peripheral area, is pressed more strongly against the disc platen, whose outer edge projects slightly, the pressure device pressing the central area of the storage disc into the hollow space in such a manner that in its center the storage disc is bent into the hollow space of the disc platen in an approximately conical fashion. This flexure promotes the frictional engagement between the storage disc and the disc platen, as a result of which the storage disc is supported additionally at its periphery. The frictional engagement can also be improved by a rubber coating on the disc platen.

In conjunction with the disc flexure, the read and/or write unit, in a further embodiment of the invention, is guided along a curved guide member adapted to the flexure of the storage disc. The preload of the storage disc and the adapted guide member of the optical unit provide very exact operating conditions.

In a further embodiment of the invention the read and/or write unit with the pressure device, on the one hand, and the disc platen, on the other hand, can be moved apart. For this purpose, the disc platen is preferably movable in the height direction. This provides a simple possibility of changing a disc without much space being required.

In a further embodiment centering means serve for exactly bringing together the read and/or write unit with the pressure device, on the one hand, and the disc platen, on the other hand. In a further embodiment of the invention the centering means comprise wedges or cones on one of the apparatus sections, which face and cooperate with V-shaped or conical grooves, which are open at their upper sides, in the other apparatus section.

THE INVENTION WILL BE DESCRIBED IN MORE DETAIL WITH REFERENCE TO THE DRAWING.

In the drawing

Figure 1:
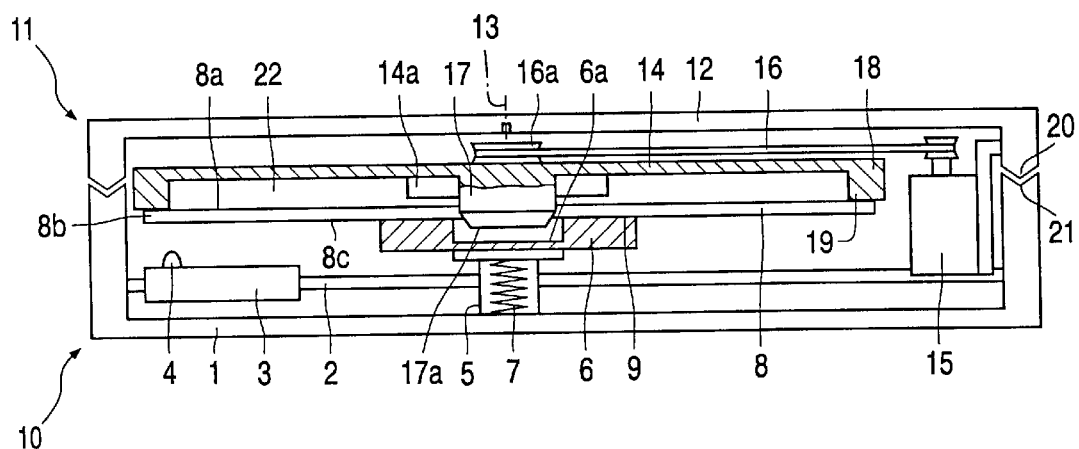
FIG. 1 is a simplified representation which shows a deck of an apparatus for playing optical storage discs, where the storage disc engages with a disc platen at the disc surface that is free from optically written or writable information, and can be set into rotation by said disc platen.

A deck of a playing apparatus for optical storage discs, which deck is shown in FIG. 1, has a chassis 1 which carries a guide member 2 for the movement of a slide 3 of an optical unit 4. Furthermore, the chassis 1 carries a pressure device 5 comprising a pressure disc 6, which can be urged against an optical storage disc 8, for example by means of a spring 7. The pressure disc 6 is freely rotatable; it should not be larger than the information-free central area 9 of the storage disc 8. The chassis 1, the guide member 2, the slide 3 with the optical unit 4, and the pressure device are parts of the lower section 10 of the deck.

An upper section 11 can be mounted on the lower section 10. The upper section 11 has an upper frame 12, which carries a disc platen 14 which acts as a turntable and which is rotatable about a central axis of rotation 13. The disc platen 14 has substantially the same diameter as the storage disc 8. A motor 15 serves for the rotary drive of the disc platen 14 and can set the disc platen 14 into rotation via a belt 16 and a roller 16a. However, it is alternatively possible to construct the disc platen 14 itself as the rotor of a motor in a manner not shown. The disc platen 14 has a central centering mandrel 17, which is engageable in the center hole of the storage disc 8. Moreover, the disc platen 14 has a downwardly projecting collar 19 at its platen periphery 18, against which collar the storage disc 8 can be pressed with its disc edge 8G.

The upper section 11 of the deck is movable in the height direction and, as a consequence, it can be lifted off in order to enable the storage disc 8 to be inserted during loading and to be removed. Centering means 20, 21 have been provided, which ensure that the upper section 11 and the lower section 10 are joined together again in an accurately fitting and centered manner. In the present embodiment these centering means comprise, for example, downwardly projecting wedges or cones 20 on the upper section 11 of the deck, which cooperate with V-shaped or conical grooves 21, which are open at their upper sides, in the lower section 10.

Figure 2:
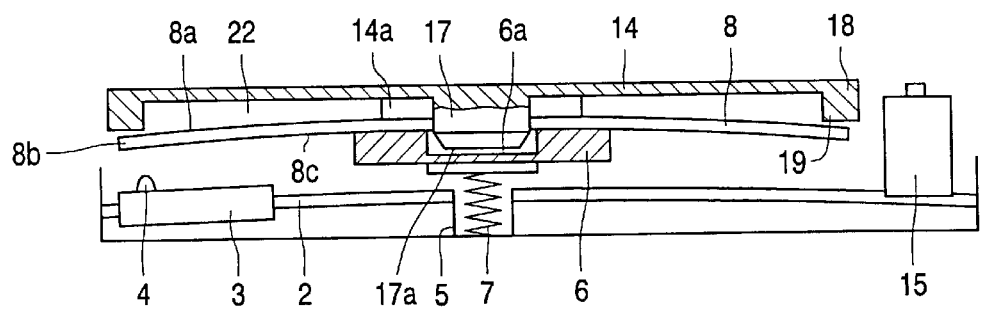
FIG. 2 is a schematic diagram of the cooperation between the curved storage disc and the curved guide member of the optical unit, the curvature being exaggerated.

This construction saves much space. At the same time, it allows the storage disc to run without undesired vibrations or flutter, particularly in a vehicle, which always transmits vibrations of the chassis to the deck. In order to achieve this, the storage disc 8 is run in a special manner. When the upper section 11 and the lower section 10 are moved together the storage disc 8 is pressed upward with the label side 8a against the disc platen 14 by means of the pressure disc 6. Thus, the pressure disc 6 acts upon the active side 8c of the storage disc 8. The storage disc 8 then engages with the central centering mandrel 17 and is centered. The disc edge 8b engages with the collar 19 on the platen periphery 18. Thus, a hollow space 22 is formed between the disc platen 14 and the storage disc 8. The pressure of the pressure disc 6 is such that it causes the storage disc 8 to be bent inwards into the hollow space 22 to a predefined extent up to a stop 14a. The extent of the flexure can be defined, for example, in that the pressure disc 6 engages with a surface 6a against the end face 17a of the centering mandrel 17 or in that in the center the disc platen 14 has a second stop 14a, which recedes with respect to the periphery 18. This flexure provides a given increase in frictional force, if the disc platen 14 is also provide with a rubber ring, not shown, which increase the contact friction. Thus, excursion of the disc periphery itself are precluded in an optimum manner. The flexure of the storage disc 8 requires an adaptation of the path along which the slide 3 of the optical unit 4 is moved. FIG. 2 shows in an exaggerated manner how the curvature of the guide member 2 of the slide of the optical unit and the curvature of the storage disc 8 are adapted to one another.

What is claimed is:

1. An apparatus for playing storage discs which can be set into rotation about a central axis of rotation by a drive motor and which cooperate with an optical unit which during the rotation writes information onto or reads it from an active side, which storage disc can be pressed against a disc platen with the aid of a pressure device, which acts upon one of its disc surfaces in order to be held in its play position and to preclude vibrations of the storage disc itself, the disc platen having a diameter which substantially corresponds to that of the storage disc, characterized by the following characteristic features:

the pressure device acts only upon the information-free central area on a first side of the storage disc, the pressure device, which acts upon the information-free central area of the storage disc is freely rotatable, the disc platen is in frictional engagement with on a second side opposite the first side of the storage disc when this the storage disc is pressed into position and is constructed as a turntable, which can be set into rotation by the drive motor, the disc platen can be brought into contact with the first side of the storage disc.

2. An apparatus as claimed in claim 1, characterized in that the drive motor sets the disc platen into rotation via a belt.

3. An apparatus as claimed in claim 1, characterized in that the disc platen itself is constructed as a drive motor.

4. An apparatus as claimed in claim 1, characterized in that the pressure device comprises a spring-loaded pressure disc whose diameter does not exceed the diameter of the information-free area of the storage disc.

5. An apparatus as claimed in claim 1, characterized in that in its peripheral area the storage disc is pressed more strongly against the disc platen, whose outer edge projects slightly, the pressure device pressing the central area of the storage disc into the hollow space in such a manner that in its center the storage disc is bent into the hollow space of the disc platen in an approximately conical fashion.

6. An apparatus as claimed in claim 1, characterized in that the read and/or write unit is guided along a curved guide member adapted to the flexure of the storage disc.

7. An apparatus as claimed in claim 1, characterized in that the read and/or write unit with the pressure device, on the one hand, and the disc platen, on the other hand, can be moved apart.

8. An apparatus as claimed in claim 1, characterized in that the disc platen is movable in the height direction.

9. An apparatus as claimed in claim 1, characterized in that centering means serve for exactly bringing together the read and/or write unit with the pressure device, on the one hand, and the disc platen, on the other hand.

10. An apparatus as claimed in claim 9, characterized in that the centering means comprise wedges or cones on a section one of the apparatus sections, which face and cooperate with V-shaped or conical grooves, which are open at their upper sides, in the other an opposing apparatus section.

11. The apparatus of claim 1 wherein the first side is the label side of an optical disk, and the optical disc is read from the second side.

12. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor and;

an optical reader for reading the storage disc from the first side of the disc.

13. An apparatus as claimed in claim 12, wherein the pressure device comprises a spring-loaded pressure disc whose diameter does not exceed the diameter of the information-free area of the storage disc.

14. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor wherein the drive motor sets the disc platen into rotation via a belt.

15. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor wherein the disc platen is constructed as a drive motor.

16. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor wherein the pressure device disc can bring the platen into contact with a peripheral portion of the storage disc deforming the storage disc.

17. An apparatus for operating a storage drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor further comprising an optical unit for exchanging information with the storage disc, wherein the optical unit is guided by a guide member adapted to curve in response to flexure within the storage disc.

18. An apparatus as claimed in claim 17, wherein the optical unit with the pressure device can be moved apart from the disc platen.

19. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor wherein the disc platen is movable in a direction that is perpendicular to a rotational plane of the storage disc.

20. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor further comprising centering means for bringing together an optical unit with the pressure device, and the platen.

21. An apparatus as claimed in claim 20, wherein the centering means comprise wedges or cones on one of the apparatus sections, which face and cooperate with V-shaped or conical grooves, which are open at their upper sides, in the other apparatus section.

22. An apparatus for operating a storage disc by a drive motor about a central axis of rotation wherein which storage disc can be pressed against a disc platen, the disc platen having a diameter which substantially corresponds to that of the storage disc, comprising:

a pressure device which acts upon a first surface of the storage disc in order to hold the storage disc in an operating position, the pressure device engaging an information-free area of the disc, wherein the pressure device causes a frictional engagement between the disc and the disc platen on a second side of the storage disc opposite the first side once the storage disc is pressed into position and wherein the disc platen is constructed as a turntable which can be set into rotation by the drive motor, the storage disc having a central aperture, the disc platen having a centering mandrel that conforms to the disc aperture for precisely positioning the storage disc on the disc platen as the disc is placed on the disc platen, the pressure device having an opening into which a portion of the centering mandrel extends.

* * * * *